(12) United States Patent
Ishizuka et al.

(10) Patent No.: US 7,034,947 B2
(45) Date of Patent: Apr. 25, 2006

(54) COMPACT INTERFERENCE MEASURING APPARATUS FOR DETECTING THE MAGNITUDE AND DIRECTION OF POSITIONAL DEVIATION

(75) Inventors: Ko Ishizuka, Omiya (JP); Hidejiro Kadowaki, Yokohama (JP); Yasushi Kaneda, Urawa (JP); Shigeki Kato, Utsunomiya (JP); Takayuki Kadoshima, Utsunomiya (JP); Sakae Horyu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 10/425,680

(22) Filed: Apr. 30, 2003

(65) Prior Publication Data

US 2003/0223075 A1 Dec. 4, 2003

Related U.S. Application Data

(62) Division of application No. 09/523,312, filed on Mar. 10, 2000, now Pat. No. 6,657,181.

(30) Foreign Application Priority Data

Mar. 12, 1999 (JP) ................................. 11-066798

(51) Int. Cl.
*G01B 9/02* (2006.01)
(52) U.S. Cl. ..................... 356/492; 356/494; 356/495
(58) Field of Classification Search ................ 356/491, 356/492, 493, 494, 495, 488, 499, 521; 250/231.16, 250/231.18
See application file for complete search history.

(56) References Cited

U.S. PATENT DOCUMENTS

| 3,316,799 A | 5/1967 | Daley et al. |
| 3,822,942 A | 7/1974 | Hock |
| 5,000,572 A | 3/1991 | Nose et al. |
| 5,283,434 A | 2/1994 | Ishizuka et al. |
| 5,333,048 A * | 7/1994 | Michel et al. ............... 356/494 |
| 5,390,022 A | 2/1995 | Ishizuka et al. |
| 5,392,116 A * | 2/1995 | Makosch .................... 356/495 |
| 5,424,535 A | 6/1995 | Albion et al. |
| 5,448,358 A | 9/1995 | Ishizuka et al. |
| 5,481,106 A | 1/1996 | Nyui et al. |
| 5,483,332 A | 1/1996 | Takamiya et al. |
| 5,483,377 A | 1/1996 | Kaneda et al. |
| 5,498,870 A | 3/1996 | Ishizuka |
| 5,502,466 A | 3/1996 | Kato et al. |
| 5,557,396 A | 9/1996 | Ishizuka et al. |
| 5,569,913 A | 10/1996 | Ishizuka et al. |
| 5,621,527 A | 4/1997 | Kaneda et al. |
| 5,629,793 A | 5/1997 | Takamiya et al. |
| 5,640,239 A | 6/1997 | Takamiya et al. |

(Continued)

FOREIGN PATENT DOCUMENTS

EP 0 525 446 2/1993

(Continued)

*Primary Examiner*—Samuel A. Turner
(74) *Attorney, Agent, or Firm*—Fitzpatrick, Cella, Harper & Scinto

(57) ABSTRACT

Interference measuring apparatus for detecting a plurality of different interference phase signals. The apparatus has a light dividing member for dividing linearly polarized light beams superposed one upon another into a plurality of light beams. The apparatus also includes a light transmitting member with a plurality of light passing portions having different light transmitting properties in conformity with the incidence positions of the plurality of light beams divided by the light dividing member. In addition, the apparatus has a polarizing plate to receive the plurality of light beams that passed through the light transmitting member.

3 Claims, 6 Drawing Sheets

U.S. PATENT DOCUMENTS

| | | |
|---|---|---|
| 5,663,794 A | 9/1997 | Ishizuka |
| 5,666,196 A | 9/1997 | Ishii et al. |
| 5,680,211 A | 10/1997 | Kaneda et al. |
| 5,717,488 A | 2/1998 | Watanabe |
| 5,737,070 A | 4/1998 | Kato |
| 5,737,116 A | 4/1998 | Kadowaki et al. |
| 5,742,577 A | 4/1998 | Horimai et al. |
| 5,754,282 A | 5/1998 | Kato et al. |
| 5,774,218 A | 6/1998 | Takamiya et al. |
| 5,796,470 A | 8/1998 | Ueda et al. |
| 5,815,267 A | 9/1998 | Kato et al. |
| 5,880,839 A | 3/1999 | Ishizuka et al. |
| 5,926,276 A | 7/1999 | Takamiya et al. |
| 5,956,140 A | 9/1999 | Ishizuka et al. |
| 6,075,235 A | 6/2000 | Chun |
| 6,151,185 A | 11/2000 | Ishizuka et al. |
| 6,229,140 B1 | 5/2001 | Ishizuka |
| 6,493,170 B1 | 12/2002 | Kato et al. |

FOREIGN PATENT DOCUMENTS

| | | |
|---|---|---|
| EP | 0 903 559 | 3/1999 |

* cited by examiner

US 7,034,947 B2

COMPACT INTERFERENCE MEASURING APPARATUS FOR DETECTING THE MAGNITUDE AND DIRECTION OF POSITIONAL DEVIATION

This is a division application of application Ser. No. 09/523,312, filed Mar. 10, 2000 now U.S. Pat. No. 6,657,181.

BACKGROUND OF THE INVENTION

1. Field of the Invention

This invention relates to an interference measuring apparatus and a grating interference-type encoder for generating a phase difference signal and highly accurately measuring a length and an angle in an industrial apparatus such as FA (factory automation).

2. Related Background Art

A laser interferometer or an incremental encoder has heretofore been utilized as a highly accurate positioning apparatus such as FA. These apparatuses convert positional deviation into a pulse train, and count the pulse number at this time to thereby detect relative positional deviation. At this time, it is also necessary to detect a direction of movement and therefore, usually two or more phase difference signals A phase and B phase are outputted and phase shift of 90° is given with a sine wave signal of a cycle being 360°.

In such a high resolving power incremental encoder and laser interferometer, there is known a method of disposing two detecting optical systems with their spatial positions deviated from each other to thereby generate phase difference signals of A phase and B phase. There is also known a method of causing polarized light beams orthogonal to each other to interfere with each other through a quarter wavelength plate, converting them into a linearly polarized light beam of which the polarization direction rotates correspondingly to the phase difference between the wave fronts of the two light beams, and then further dividing it into a plurality of light beams. Those light beams are caused to be transmitted through polarizing plates disposed with their polarization axes deviated in different directions to thereby generate a phase difference signal light beam.

FIG. 1 of the accompanying drawings shows a perspective view of a non-contact distance sensor of the conventional laser interference-type, and a laser beam L from a coherent light source 1 passes through a collimator lens 2 and a non-polarizing beam splitter 3 and is polarized on the polarizing surface 4a of a probe-like polarizing prism 4. S-polarized light reflected by the polarizing surface 4a emerges from the probe-like polarizing prism 4 toward a slider 5, is reflected by the surface 5a to be measured by the slider 5, and again returns along the original optical path to the polarizing surface 4a of the probe-like polarizing prism 4.

On the other hand, P-polarized light transmitted through the polarizing surface 4a is reflected by the upper reference mirror surface 4b of the probe-like polarizing prism 4 and likewise returns to the polarizing surface 4a. These two polarized lights are re-combined on the polarizing surface 4a, travel through the probe-like polarizing prism 4, are reflected by a non-polarizing beam splitter 3, pass through a quarter wavelength plate 6 and an aperture in an aperture plate 7, and are amplitude-divided by a four-division diffraction grating 8. These amplitude-divided light beams pass through polarizing plates 9a–9d, and are received by the four areas 10a–10d of a light-receiving element 10. The minute displacement of the slider 5 is measured by an interference signal at this time.

However, in the above-described example of the prior art, the phase shift is given by arrangement or the like of the polarizing plates 9a–9d and therefore, there is a possibility that if there are an alignment error and manufacturing errors of the polarizing plates 9a–9d, the phase difference signal is not stable. On the other hand, in the case of the interference between linearly polarized lights orthogonal to each other, a space is required for arrangement of optical parts such as the quarter wavelength plate 6 and the four polarizing plates 9a–9d and therefore, the apparatus becomes bulky and the assembly adjustment of all these is necessary.

SUMMARY OF THE INVENTION

In view of the above-described example of the prior art, it is an object of the present invention to provide a compact interference measuring apparatus easy to assemble for collectively detecting a plurality of stable phase difference signals.

It is another object of the present invention to provide an interference measuring apparatus such as a compact and highly accurate grating interference-type encoder.

Other objects of the present invention will become apparent from the following description of some embodiments of the present invention.

DESCRIPTION OF THE PREFERRED EMBODIMENTS

The present invention will hereinafter be described in detail with respect to some embodiments thereof shown in FIGS. 2 to 6.

Figure 1:
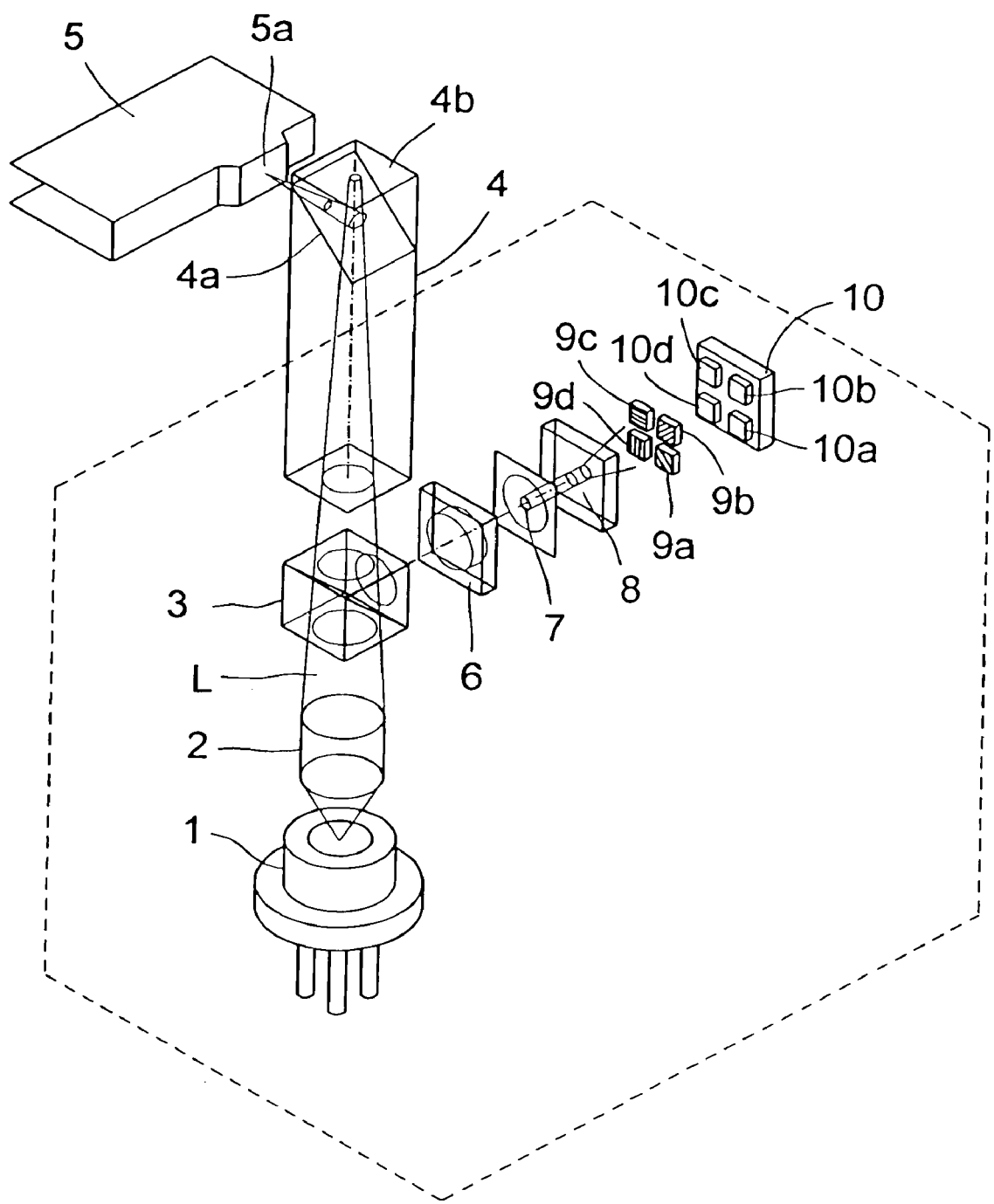
FIG. 1 is a perspective view of an interference measuring apparatus according to the prior art.
Figure 2:
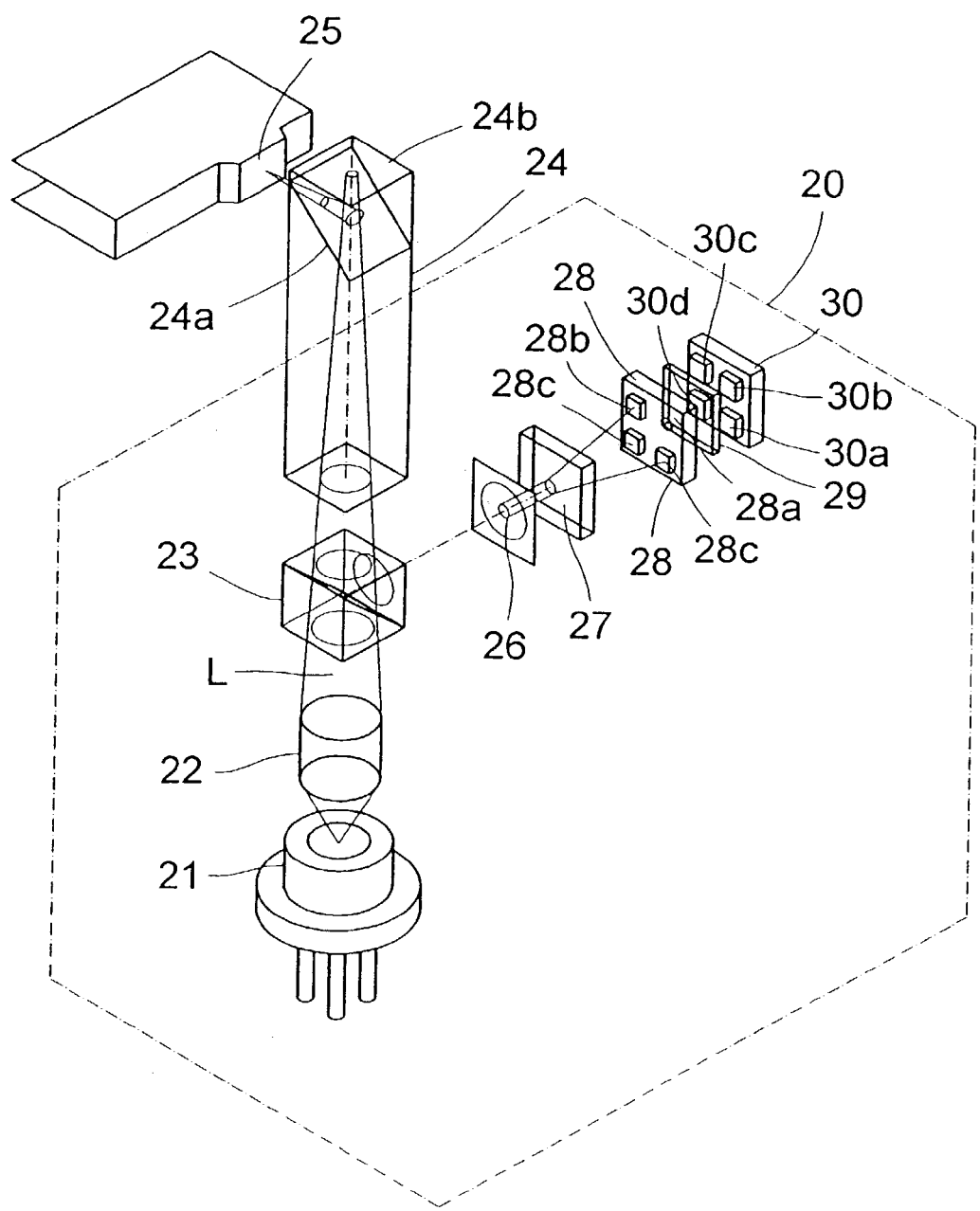
FIG. 2 is a perspective view of an interference measuring apparatus according to a first embodiment of the present invention.

FIG. 2 shows a perspective view of a first embodiment, and in a non-contact distance sensor 20, a coherent light source 21 such as a laser diode, a collimator lens 22, a non-polarizing beam splitter 23 and an optical type probe-like polarizing prism 24 are arranged in succession. The probe-like polarizing prism 24 has a polarizing beam splitter surface 24a and a reference mirror surface 24b, and a slider side 25 which is a region to be measured is disposed on the front surface of the probe-like polarizing prism 24 in the direction of reflection of the polarizing surface 24a.

An aperture plate 26, a four-division diffraction grating plate 27 such as a hounds-tooth-checkered phase diffraction grating, a phase difference rock crystal plate 28 having four areas 28a–28d of different thicknesses on a substrate, a 45° azimuth polarizing plate 29 having an optic axis in an azimuth of 45° and a four-division light receiving element 30 having four light receiving areas 30a–30d are arranged in succession in the direction of reflection of the non-polarizing beam splitter 23.

During measurement, a divergent light L from the coherent light source 21 is made into a substantially condensed light by the collimator lens 22, passes through the non-polarizing beam splitter 23, and is divided into a transmitted light and a reflected light on the polarizing beam splitter surface 24a of the probe-like polarizing prism 24. S-polarized light reflected by the polarizing surface 24a emerges from the probe-like polarizing prism 24 toward the slider side 25, and is reflected by the slider side 25, and the reflected light passes along the original optical path and is returned to the polarizing surface 24a of the probe-like polarizing prism 24. On the other hand, P-polarized light transmitted through the polarizing surface 24a is reflected by the reference mirror surface 24b in the probe-like polarizing prism 24, and is likewise returned to the polarizing surface 24a.

These two polarized lights are combined together on the polarizing surface 24a of the probe-like polarizing prism 24, and become a bright-dark signal of an interference light beam by a polarizing interference optical system which will be described later. When the distance between the probe-like polarization prism 24 and the slider side 25 changes, each time the difference between the lengths of the forward and backward optical paths of the two light beams separated by the polarization surface 24a becomes integer times as great as the wavelength of the coherent light source 21, the bright and dark thereof changes. That is, if a laser diode of a wavelength 0.78 μm is used as the coherent light source 21, when the distance between it and the slider side 25 deviates by 0.39 μm, the light and shade change into a sine waveform by a cycle.

This change in the bright and dark is converted into an electrical signal by the light receiving element 30, and if the distance between the prism 24 and the slider side 25 is preset to such a distance as will be the middle of the bright and dark, when the distance between the prism 24 and the slider side 25 changes minutely, the level of the electrical signal will change sensitively. Accordingly, by the utilization of this sine wave-like change in the level of the electrical signal and by the use of a conventional electric circuit of resolving power capable of dividing a sine wave of a wavelength 0.39 μm into several tens of phases, the change in the distance can be detected with resolving power of the order of 0.01 μm. Also, if there is a 90° phase difference bright-dark signal of two phases, a sine wave can be divided into several tens to several hundreds of phases by the use of a conventional electrical interpolation circuit and therefore, the change in the distance can be detected with higher resolving power of 0.001 μm.

Figure 3A:
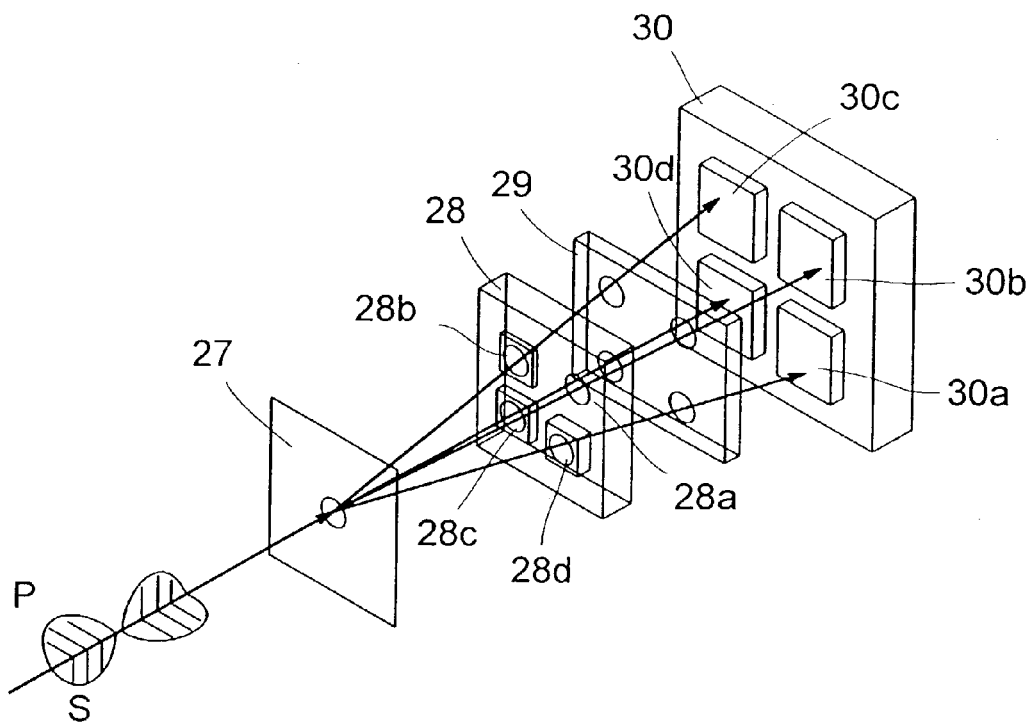
FIG. 3A is an illustration of the phase shift of a wave front by a phase difference rock crystal plate.

FIG. 3A shows a method of generating a 90° phase difference bright-dark signal of four phases, and at the stage whereat the light emerges from the probe-like polarizing prism 24, the wave fronts of the two light beams overlap each other, but the light beams are linearly polarized light beams of wave fronts orthogonal to each other and do not interfere with each other to become a bright-dark signal. These light beams are reflected by the non-polarizing beam splitter 23, pass through the aperture in the aperture plate 26 and are amplitude-divided into four equivalent light beams including two linearly polarized light beams orthogonal to each other by the four-division diffraction grating plate 27.

At this time, these four light beams travel and separate with only their intensities reduced by the division, and enter the rock crystal plate 28 disposed in an appropriate space.

This rock crystal plate 28 is used as an optical phase plate, and has two optic axes, i.e., f-axis and s-axis, and since there is a difference in refractive index between these axes, a linearly polarized wave component in which an electric field component in the electromagnetic wave of light has entered in parallelism to the f-axis emerges with its phase advanced as compared with a linearly polarized wave component in which the electric field component has entered in parallelism to the s-axis. The phase difference Γ (deg) at this time is represented by the following expression when the wavelength of the coherent light source 21 is defined as λ, the refractive index of the rock crystal for an abnormal ray of light is defined as ne, the refractive index of the rock crystal for a normal ray of light is defined as no, and the thickness of the rock crystal plate 28 is fined as t.

$$\Gamma = (360/\lambda) \cdot (ne-no)t$$

The refractive index ne for an extraordinary ray of light corresponds to the linear polarized wave substantially parallel to the s-axis, and the refractive index no for an ordinary ray of light corresponds to the linearly polarized light beam parallel to the f-axis. The typical values of the refractive index of rock crystal are ne =1.5477 and no =1.5387 and therefore, t satisfying the phase difference Γ=90 (deg) can be found as follows by substantially λ=0.78 μm, ne=1.5477 and no=1.5387.

$$t = \lambda / \{4(ne-no)\} = 21.67 \text{ μm}$$

Figure 3B:
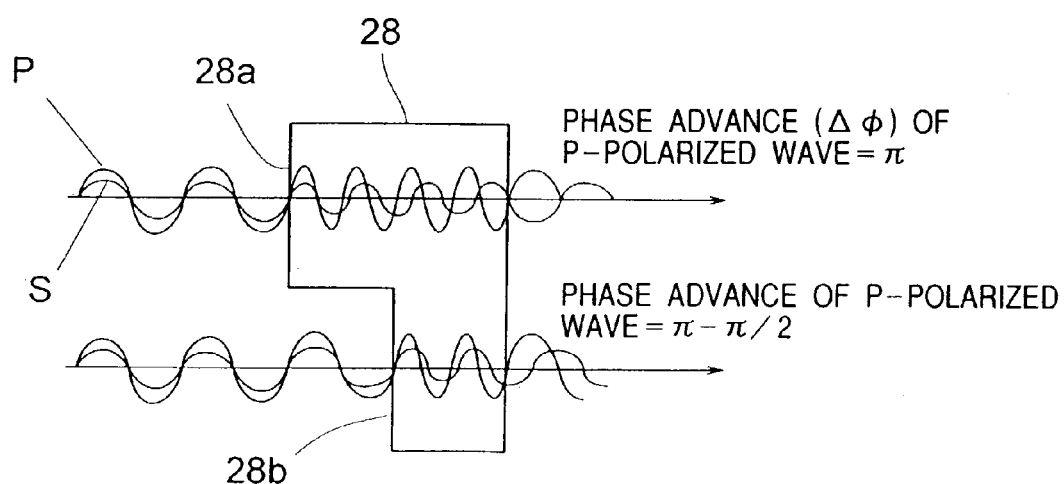
FIG. 3B is a perspective view of a push-pull optical system.

In the present embodiment, the rock crystal plate 28, as shown in FIG. 3B, is disposed so that the f-axis which is an optic axis may be the direction of the S-polarized wave, and is provided with level differences by the etching process so as to assume four different thicknesses of four-square configuration, and the four divided light beams enter respective areas 28a–28d and emerge from the back surfaces thereof. The area 28a is a portion which is not worked so as to have a level difference and has the original thickness of the rock crystal substrate, and the area 28b has its portion corresponding to Δt=21.67 μm etching-processed by hydrofluoric acid so that the phase of the wave front of only the S-polarized component may be delayed by 90° as compared with the area 28a.

The area 28c has its portion corresponding to 2·Δt etching-processed so that the phase of the wave front of only the S-polarized component may be delayed by 180° as compared with the area 28a, and the area 28d has its portion corresponding to 3·Δt etching-processed so that the phase of the wave front of only the S-polarized component may be delayed by 270° as compared with the area 28a. These three level differences are achieved by effecting the etching of the level difference of 2·Δt once in the areas 28c and 28d, and effecting the etching of the level difference of Δt once in the areas 28a and 28d.

Light beams (P, S) transmitted through the area 28a are relatively advanced in the phase of the wave front of the S-polarized wave among the P- and S-polarized waves by the original thickness of the rock crystal plate 28 and the disposition of the optic axis thereof, and the amount of this advance is defined as ΔΦ. As regards the light beams (P, S) transmitted through the area 28b, the advance of the phase of the wave front of the S-polarized wave is returned by 90° and the amount of phase advance is ΔΦ−90° because the rock crystal plate 28 has become thinner by Δt than the original thickness thereof by etching.

As regards the light beams (P, S) transmitted through the area 28c, the advance of the phase of the wave front of the S-polarized wave is returned by 180° and the amount of phase advance is ΔΦ−180° because the rock crystal plate 28 has become thinner by 2·Δt than the original thickness thereof by etching. As regards the light beams (P, S) transmitted through the area 28d, the advance of the phase of the wave front of the S-polarized wave is returned by 270° and the amount of phase advance is ΔΦ−270° because the rock crystal plate 28 has become thinner by 3·Δt than the original thickness thereof by etching.

The light beams (P, S) transmitted through these four areas 28a–28d has its 45° polarized component extracted by the polarizing plate 29 having its optic axis in the azimuth of 45°, and these P- and S-polarized waves are converted into 45° linearly polarized waves while having phase information and, therefore, cause interference therebetween and become bright-dark signal light beams. At this time, the phase-difference between the light beams P and S which have emerged from the respective areas 28a–28d deviates each integer times λ/4 and therefore, the timing (phase) of the bright and dark of the interference light deviates each quarter cycle. Accordingly, these interference light beams enter the four light receiving elements 30a–30d, whereby four phase difference signals are obtained at a time. These four interference light beams have a phase shift at each quarter cycle and, therefore, have the A+ phase, B+ phase, A− phase and B− phase of the 90° phase difference signals, which are four-phase push-pull signals.

In the present embodiment, the four-division diffraction grating 27, the phase difference rock crystal plate 28, the 45° azimuth polarizing plate 29 and the four-division light receiving elements 30a–30d are simply disposed in an orderly way and therefore, the work of disposing a plurality of minute polarizing plates or the like becomes unnecessary, and a very simple and compact apparatus can be realized. Particularly, it can be easily realized by processing the diffraction grating 27, the rock crystal plate 28 and the polarizing plate 29 for each large substrate by a method similar to the semiconductor process, and finally cutting them.

Figure 4:
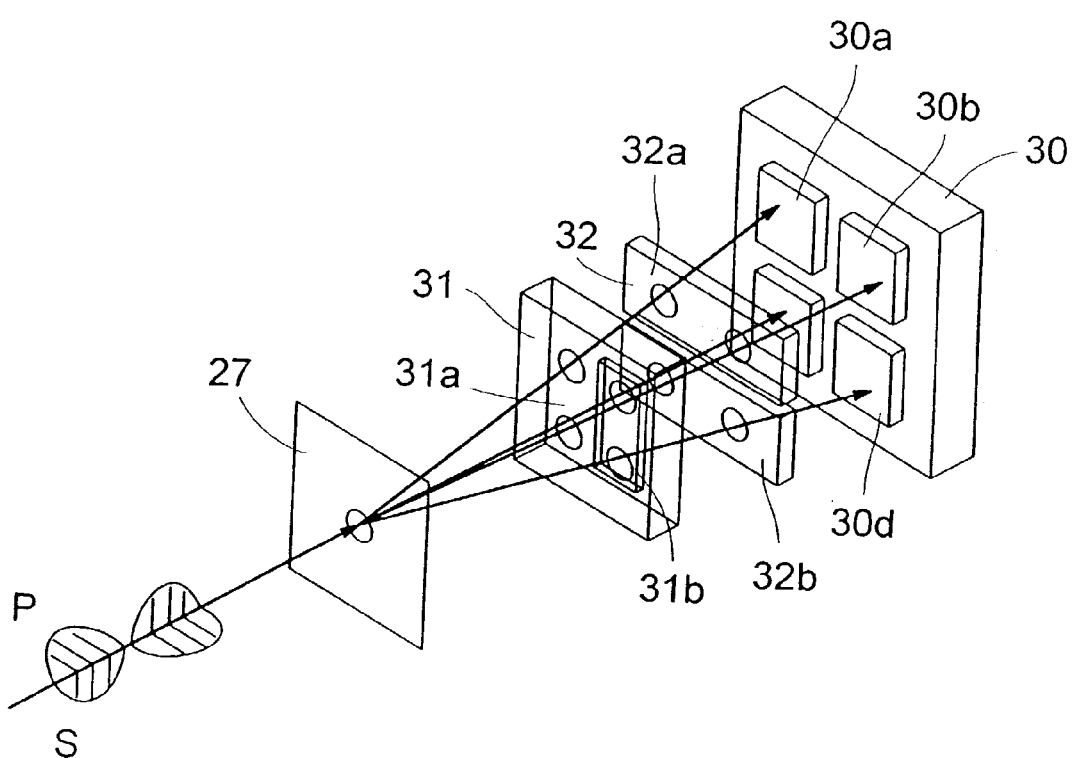
FIG. 4 is a perspective view of a push-pull optical system according to a second embodiment of the present invention.

FIG. 4 shows a perspective view of a push-pull optical system according to a second embodiment, and a rock crystal plate 31 in this embodiment is formed with a level difference by the etching process so as to have two different thicknesses in a horizontal direction, and is disposed so that the f-axis which is an optic axis may be the direction of S-polarized wave. This rock crystal plate 31 is designed such that each two of four divided light beams enter areas 31a and 31b, respectively, and are transmitted from the back surface thereof, and the area 31a is a portion which is not worked into a level difference, and has the original thickness of a rock crystal substrate. Also, the area 31b, as compared with the area 31a, is worked into a level difference so that only the S-polarized component may be delayed in the phase of a λ/4 wave front, and this level difference is achieved by effecting the etching of a level difference corresponding to λ/2 once in the area 31b. Also, a polarizing plate 32 in the present embodiment comprises a polarizing plate 32a having an optic axis in the azimuth of 45° and a polarizing plate 32b having an optical axis in the azimuth of 135°, the polarizing plates 32a and 32b being disposed in a vertical direction.

Of the light beams (P, S) divided in the four-division diffraction grating plate 27, the left light beam passes through the area 31a of the rock crystal plate 31 and the right light beam passes through the area 31b of the rock crystal plate 31. At this time, the light beams (P, S) transmitted through the area 31a are relatively advanced in the phase of the wave front of the S-polarized wave between P- and S-polarized waves by the original thickness of the rock crystal plate 31 and the disposition of the optical axis thereof, and this amount of advance is defined as ΔΦ. As regards the light beams (P, S) transmitted through the area 31b, the advance of the phase of the wave front of the S-polarized wave is returned by λ/4 and the amount of phase advance is ΔΦ−λ/4 because the rock crystal plate 31 has become thinner by Δt than the original thickness thereof by etching.

Of the light beams (P, S) transmitted through these two areas 31a and 31b, the upper two light beams pass through the polarizing plate 32a in the azimuth of 45°, and the lower two light beams pass through the polarizing plate 32b in the azimuth of 135°, and a 45° polarized component or a 135° polarized component is extracted, but at this tune, the P- and S-polarized waves are converted into 45° or 135° linearly polarized waves while having phase information, and cause interference and become a bright-dark signal light beam.

The wave front phase between the light beams P and S which have emerged from the two areas 31a and 31b deviates by λ/4 and therefore, the timing (phase) of the bright and dark of the interference light beam of the light beam transmitted through the polarizing plate 32a is such that the light beam transmitted through the area 31b advances by a quarter cycle as compared with the light beam transmitted through the area 31a. Also, the timing (phase) of the bright and dark of the interference light beam of the light beam transmitted through the polarizing plate 32b is such that the light beam transmitted through the area 31b advances by a quarter cycle as compared with the light beam passed through the area 31a. Here, the bright and dark phase of the light beam transmitted through the polarizing plate 32a and the bright and dark phase of the light beam transmitted through the polarizing plate 32b deviate by 180° from each other and, therefore, the phase of the four bright and dark light beams become 0°, 90°, 180° and 270°, and become a four-phase push-pull signal as in the first embodiment.

In the present embodiment, the four-division diffraction grating 27, the phase difference rock crystal plate 31, the 45° azimuth polarizing plate 32a, the 135° azimuth polarizing plate 32b and the four-division light receiving elements 30a–30d are simply disposed in an orderly way, whereby a very simple and compact construction can be realized. Particularly, the rock crystal plate 31 can be worked by an etching process, and the polarizing plate 32a and the polarizing plate 32b are stuck together adjacent to each other, whereby assembly adjustment can be effected relatively simply.

The present embodiment can be applied to a grating interference-type encoder in which coherent light beams divided into two are applied to diffraction gratings moved relative to each other, and diffracted lights of different order numbers are taken out to thereby generate an interference phase signal. It can also be applied to other popular grating interference-type encoders and interference measuring apparatuses.

Figure 5:
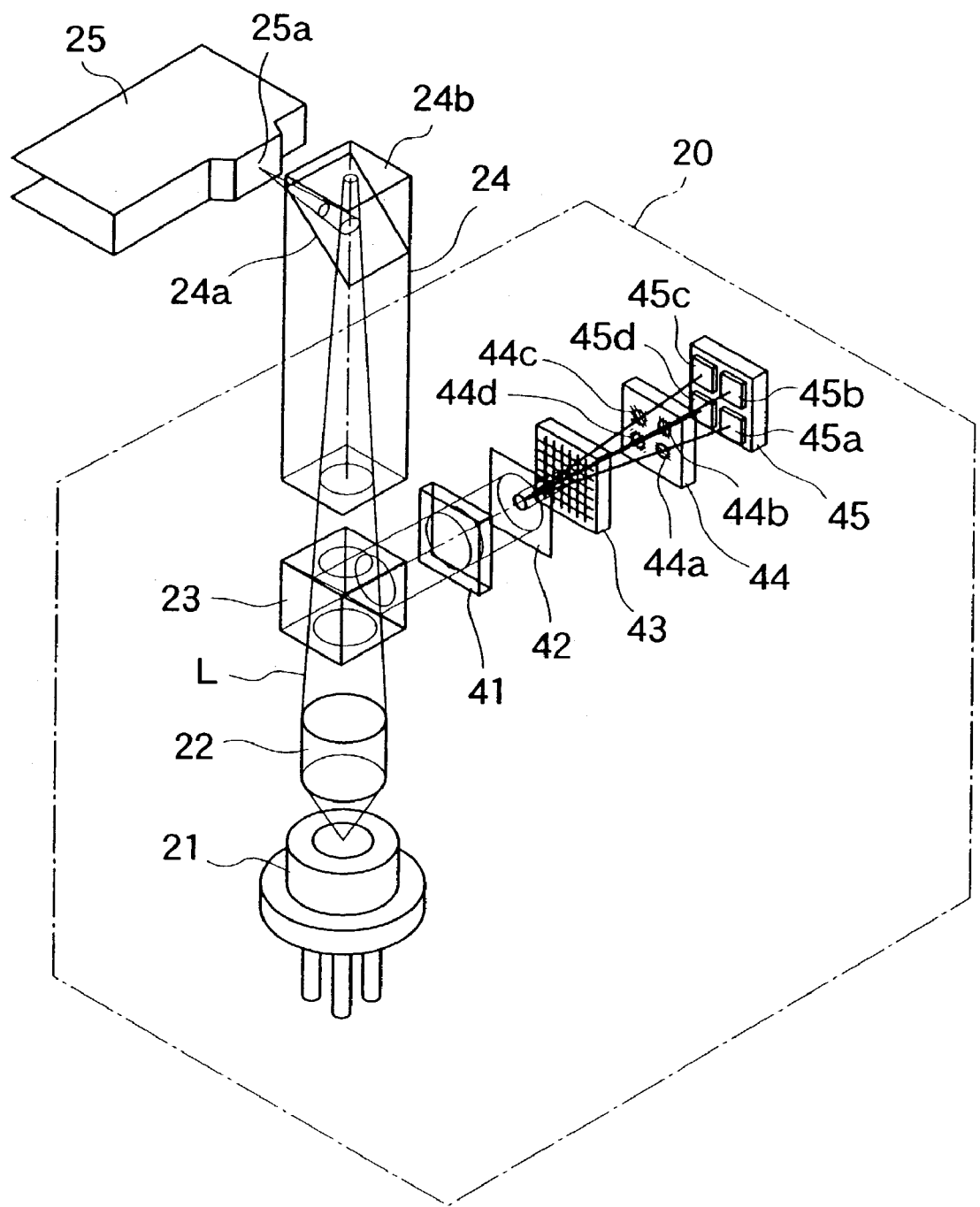
FIG. 5 is a perspective view of an interference measuring apparatus according to a third embodiment of the present invention.

FIG. 5 shows a perspective view of a third embodiment. In a non-contact sensor 20, as in the case of FIG. 2, a coherent light source 21 such as a laser diode, a collimator lens 22, a non-polarizing beam splitter 23 and an optical-type probe-like polarizing prism 24 are disposed in succession, and the probe-like polarizing prism 24 has a polarizing beam splitter surface 24a and a reference mirror surface 24b, and a slider side 25 which is a non-measuring region is disposed on the front surface of the probe-like polarizing prism 24 in the direction of reflection of the polarizing surface 24a.

A quarter wavelength plate 41, an aperture plate 42, a four-division diffraction grating plate 43 such as a houndstooth-checkered phase diffraction grating, a polarizing plate mask 44 having four gratings 44a–44d formed on a substrate with their arrangement azimuths shifted by 45°, and a four-division light receiving element 45 having four areas 45a–45d are arranged in succession in the direction of reflection of the non-polarizing beam splitter 23.

During measurement, a divergent light L from the coherent light source 21, as in the case of FIG. 2, is divided into a transmitted light and a reflected light on the polarizing beam splitter surface 24a of the probe-like polarizing prism 24. S-polarized light reflected by the polarizing surface 24a emerges from the probe-like polarizing prism 24 toward the slider side 25, is reflected by the slider side 25, and is returned to the polarizing surface 24a of the probe-like polarizing prism 24. On the other hand, P-polarized light transmitted through the polarizing surface 24a is likewise returned to the polarizing surface 24a.

These two polarized lights are combined together on the polarizing surface 24a of the probe-like polarizing prism 24, and become the bright-dark signal of an interference light beam by a polarizing interference optical system which will be described later. When the distance between the probe-like polarizing prism 24 and the slider side 25 changes, the difference between the lengths of the forward and backward optical paths of the two light beams separated by the polarizing surface 24a becomes integer times as great as the wavelength of the coherent light source 21, whereafter the bright and dark thereof change.

This change in the bright and dark is converted into an electrical signal by the light receiving element 45, and as in the case of FIG. 2, any change in the distance can be detected with high resolving power.

Figure 6:
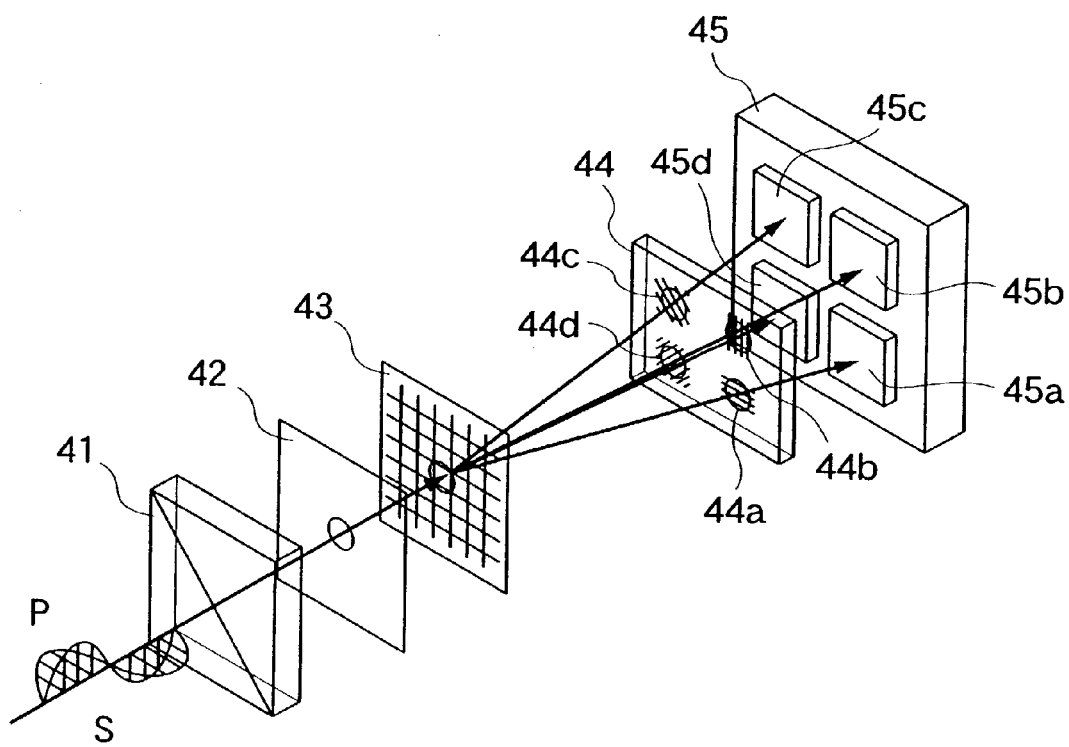
FIG. 6 is a view for explaining production of 90° phase difference bright and dark signal of four phases.

FIG. 6 shows a method of producing the 90° phase difference bright-dark signal of four phases described above, and at the stage whereat the two light beams emerge from the probe-like polarizing prism 24, the two light beams are linearly polarized light beams of which the wave fronts overlap each other, but are orthogonal to each other, and do not interfere with each other to become a bright-dark signal. These are reflected by the non-polarizing beam splitter 23, are transmitted through the quarter wavelength plate 41 and are converted into oppositely directed circularly polarized lights, and their vector-combined wave fronts become a linearly polarized light. Also, the direction of the polarized wave front of the linearly polarized light depends on the phase difference between the two light beams, and when the phase shifts by 360° between the two light beams, the polarized wave front rotates by 180°.

This linearly polarized light beam of which the polarized wave front rotates passes through an aperture in the aperture plate 42 and is amplitude divided into equivalent linearly polarized light beams by the four-division diffraction grating plate 43. At this time, these four light beams separate from one another with the signal in a state in which only the intensities thereof are reduced by the division, and enter the polarizing plate mask 44 disposed in an appropriate space.

This polarizing plate mask 44 functions as an optical polarizing plate and can therefore be freely designed when it is formed in advance on a glass plate by the photolithographic process or the like. In the present embodiment, in order to obtain a four-phase bright-dark signal, there is required an interference signal of which the bright and dark phases shift by 90° each and therefore, metal grating lines are formed with their arrangement azimuths shifted by 45° from one another in each of areas through which the four light beams are transmitted. Also, the pitch of the grating lines is made sufficiently smaller than the wavelength of the coherent light source.

When the rotating linearly polarized light is orthogonal to the grating lines and when it coincides with the grating lines, the transmitted light becomes maximum and becomes minimum, respectively, and therefore, phase difference signals differing in the timing of bright and dark from one another are obtained in the four areas.

In the present embodiment, the quarter wavelength plate 41, the aperture plate 42, the four-division diffraction grating plate 43, the polarizing plate mask 44 and the four-division light receiving elements 45a–45d are simply disposed in an orderly way and therefore, the apparatus can be very simply and compactly constructed and the phase difference is settled highly accurately.

The present embodiment can be applied to a grating interference-type encoder in which a coherent light beam divided into two is applied to diffraction gratings moved relative to each other and diffracted lights of different orders are taken out to thereby produce an interference signal. It can also be applied to other popular grating interference-type encoders and interference measuring apparatuses.

As described above, the above-described interference-type measuring apparatus and grating interference-type encoder can realize an optical system very simply and compactly, and can collectively detect a plurality of stable phase difference signals and can effect highly accurate measurement.

Also, the above-described optical apparatus can realize such a measuring apparatus.

What is claimed is:

1. An interference measuring apparatus including:
   an optical system for dividing a coherent light beam into two light beams, causing said divided two light beams to pass along discrete optical paths and making them into linearly polarized light beams orthogonal to each other and modulating to the phase of the wave front of at least one of them, and again superposing the wave fronts of said linearly polarized light beams one upon the other;
   an optical member for converting the superposed light beams into a linearly polarized light beam of which the polarization azimuth rotates;
   a light dividing member for dividing said linearly polarized light beam of which the polarization azimuth rotates into a plurality of light beams;
   a grating plate having different polarization transmitting properties in conformity with the incidence positions of the plurality of light beams; and
   a plurality of light receiving elements for individually receiving the light beams transmitted through said grating plate, a plurality of different interference phase signals being provided by the reception of lights of said light receiving elements.

2. The apparatus of claim 1, wherein said grating plate is formed with transmitting and non-transmitting grating patterns comprising a metal pattern with a plane divided into a plurality of areas, and the azimuth of grating lines of said grating patterns differs in each area.

3. The apparatus of claim 1, wherein the apparatus constitutes a non-contact distance sensor or a grating interference-type encoder.

* * * * *

UNITED STATES PATENT AND TRADEMARK OFFICE
CERTIFICATE OF CORRECTION

PATENT NO. : 7,034,947 B2 Page 1 of 1
APPLICATION NO. : 10/425680
DATED : April 25, 2006
INVENTOR(S) : Ko Ishizuka et al.

It is certified that error appears in the above-identified patent and that said Letters Patent is hereby corrected as shown below:

<u>Column 4</u>:

Line 18, "fined" should read --defined--.

Signed and Sealed this

Nineteenth Day of December, 2006

JON W. DUDAS
*Director of the United States Patent and Trademark Office*